United States Patent
Staver et al.

(10) Patent No.: US 7,269,239 B2
(45) Date of Patent: Sep. 11, 2007

(54) SIMPLE TWO-WIRE COMMUNICATION PROTOCOL WITH FEEDBACK STATUS

(75) Inventors: Daniel A Staver, Colorado Springs, CO (US); Bruce Carl Wall, Colorado Springs, CO (US); Tue Tran, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 826 days.

(21) Appl. No.: 10/208,014

(22) Filed: Jul. 31, 2002

(65) Prior Publication Data
US 2004/0022325 A1    Feb. 5, 2004

(51) Int. Cl.
*H04L 7/00* (2006.01)
(52) U.S. Cl. .................. 375/357; 375/354; 375/377; 323/298; 323/354
(58) Field of Classification Search .......... 375/357, 375/354, 377, 211, 214; 323/298, 354; 326/30, 326/37, 39–41, 113; 327/101, 108, 306, 327/337, 565; 338/48; 365/46, 228; 370/517; 709/213, 234
See application file for complete search history.

(56) References Cited

U.S. PATENT DOCUMENTS

| 4,468,607 | A | * | 8/1984 | Tanaka et al. | 323/354 |
| 4,668,932 | A | * | 5/1987 | Drori et al. | 338/48 |
| 5,084,667 | A | * | 1/1992 | Drori et al. | 323/298 |
| 5,594,866 | A | * | 1/1997 | Nugent | 709/234 |
| 5,666,078 | A | * | 9/1997 | Lamphier et al. | 327/108 |
| 6,359,466 | B1 | * | 3/2002 | Sharpe-Geisler | 326/37 |
| 6,441,671 | B1 | * | 8/2002 | Rastegar | 327/337 |

* cited by examiner

*Primary Examiner*—David C. Payne
*Assistant Examiner*—Nader Bolourchi
(74) *Attorney, Agent, or Firm*—Sughrue Mion, PLLC

(57) ABSTRACT

A two-wire communication protocol between a controller device and a controlled device, wherein both devices are coupled by a clock line and a data line. The controller device sends control signals comprising N bits, N being greater than or equal to two, to the controlled device via the data line. Each bit of said control signals is latched onto the controlled device on consecutive edges of a clock signal sent by the controller device to the controlled device on the clock line.

8 Claims, 3 Drawing Sheets

| CS | INC | U/D | MODE |
|---|---|---|---|
| LOW | ↘ | HIGH | INCREMENT |
| LOW | ↘ | LOW | DECREMENT |

| FUNCTION | FIRST BIT | SECOND BIT |
|---|---|---|
| DECREMENT | 0 | 0 |
| INCREMENT | 1 | 1 |
| TEST MODE 1 | 0 | 1 |
| TEST MODE 2 | 1 | 0 |

SIMPLE TWO-WIRE COMMUNICATION PROTOCOL WITH FEEDBACK STATUS

BACKGROUND OF THE INVENTION

The present invention relates to a two-wire communication protocol between a controller device and a controlled device. The invention more particularly relates to digitally trimmable electronic devices such as a capacitor, a potentiometer, a current source, or other variable impedance elements.

Both controller and controlled devices are coupled by a clock line and a data line. The controller device sends control signals comprising N bits, N being greater than or equal to two, to the controlled device on the data line.

In the prior art, the document U.S. Pat. No. 5,084,667 discloses a variable impedance circuit for incorporation into electronic circuits in place of a potentiometer or similar mechanical variable impedance element. The impedance of the impedance circuit is set by electrical signals sent thereto. Once set, the impedance value is stored in a programmable non-volatile read only memory. When power is restored, this stored impedance value is re-established.

FIG. 1 is a block diagram of the impedance circuit according to this document. The variable impedance circuit 1 consists of an impedance network 2 which consists of a number of fixed impedance elements and switches which are not shown. The switches are used to connect various combinations of impedance elements between two terminals 3 and 4. The particular combination is determined by a value stored in a control circuit which is counter 5. The count stored in the counter may be altered by signals on two lines 6 and 7. The Up/Down (U/D) signal on line 6 determines whether counter 5 will be incremented or decremented by a predetermined amount in response to an increment (INC) signal on line 7.

A third signal line 8 which is referred to as chip select (CS) line 8 is used as an activation signal for counter 5. When chip select line 8 is low, counter 5 responds to signals on lines 6 and 7. This enables the circuit controlling the variable impedance circuit 1 to alter the value stored in counter 5. This controlling circuit causes chip select line 8 to go low. It then couples the appropriate signals to counter 5 on lines 6 and 7 to cause the value stored in counter 5 to change to the new desired value.

FIG. 2 is an array of the selection mode of the variable impedance circuit. When the CS line is low, the value stored in the counter may be altered. On the falling edge of the INC line, the counter is incremented if the U/D line is high and decremented if U/D line is low.

Such a variable impedance circuit has some drawbacks. First, two lines INC and U/D are used to allow only two control signals for the counter, an increment and a decrement signal. Further, with these two lines INC and U/D no start and end signals are available. This is why it is provided with a third line CS which determines by its level whether the value stored in the counter is alterable or not. To implement such a solution, it is necessary to have an additional terminal on the circuit.

In the prior art, the document WO 01/76069 discloses a method of electronically adjusting electrical capacitors which may be variably set or trimmed to a desired value of capacitance.

FIG. 3 is a block diagram illustrating the electronic trim capacitor 10 which is implemented as a digitally programmable capacitance 11. The electronic trim capacitor 10 has a first power terminal 12 (Vdd) and a second power terminal 13 (Vss); a first capacitor terminal 14 (C1) and a second capacitor terminal 15 (C2); a program terminal 16 (PROGRAM); and an enable terminal 17 (ENABLE). The first power terminal 12 and the second power terminal 13 may receive suitable electrical power to operate the electronic trim capacitor 10. Also, the first capacitor terminal 14 and the second capacitor terminal 15 connect the electronic trim capacitor 10 to a general circuit (not shown) which requires capacitive adjustment such as an amplifier or an oscillator. The program terminal 16 and the enable terminal 17 here provide the ability to digitally program the electronic trim capacitor 10 to a desired specific value of capacitance.

The programming method used with the electronic trim capacitor 10 comprises the following main steps. In an initial step, programming is initiated by setting the enable terminal 17 to a particular electrical state.

In a following step, programming continues by supplying an appropriate pulse signal to the program terminal 16. In this manner, supplying a selected number of pulses in the pulse signal, while the enable terminal 17 is enabled, will produce a desired total number of capacitance increments in the electronic trim capacitor 10.

Finally in another step, the internal logic of the electronic trim capacitor 10 sets a capacitive value which is exhibited at the first capacitor terminal 12 and the second capacitor terminal 13.

Such an electronic trim capacitor also has some drawbacks. After setting the enable terminal in order to activate the electronic trim capacitor, only an increment function is provided. With only one control signal available, there is no freedom to modify the value of the capacitance or to monitor this value. Further, if a decrement operation is requested or if the desired value is less than the current value of the electronic trim capacitor, it is necessary to provide with a reset terminal to reset the capacitance value or a mechanism which resets the capacitance value to zero when the maximum value is reached by successive increment signals. In both cases it is not worthy, the first alternative requires an additional terminal and the second one takes too much time.

SUMMARY OF THE INVENTION

The object of the present invention is to overcome the afore cited drawbacks of both prior arts and, in particular, to provide a simple two-wire communication protocol for digitally trimmable electronic devices with several control signals.

These objects are achieved as a result of a two-wire communication protocol as defined herein before and characterized in that each bit of the control signals is latched onto the controlled device on consecutive edges of the clock signal sent by the controller device to the controlled device on the clock line.

It is to be noticed that a bit is typically defined as a digital bit with two levels Further, after at least one of the N-1 first bits of a control signal has been latched onto the controlled device, the data line is temporarily set in a high impedance state by the controller device during which a first acknowledgment data bit, which acknowledges whether a desired instruction is possible or not, is generated by the controlled device.

Preferably, the number of bits of a control signal is equal to 2, which allows four control signals, and the controlled device is an electronic device with a digitally adjustable quantity which comprises a counter storing a value of the digitally adjustable quantity, and the four control signals include at least an increment signal and a decrement signal of said value.

BRIEF DESCRIPTION OF THE DRAWINGS

Other features and advantages of the invention will appear from the following description of particular embodiments of the invention, given by way of non-limiting examples, with reference to the annexed drawings, in which.

DETAILED DESCRIPTION OF THE INVENTION

Figure 4:
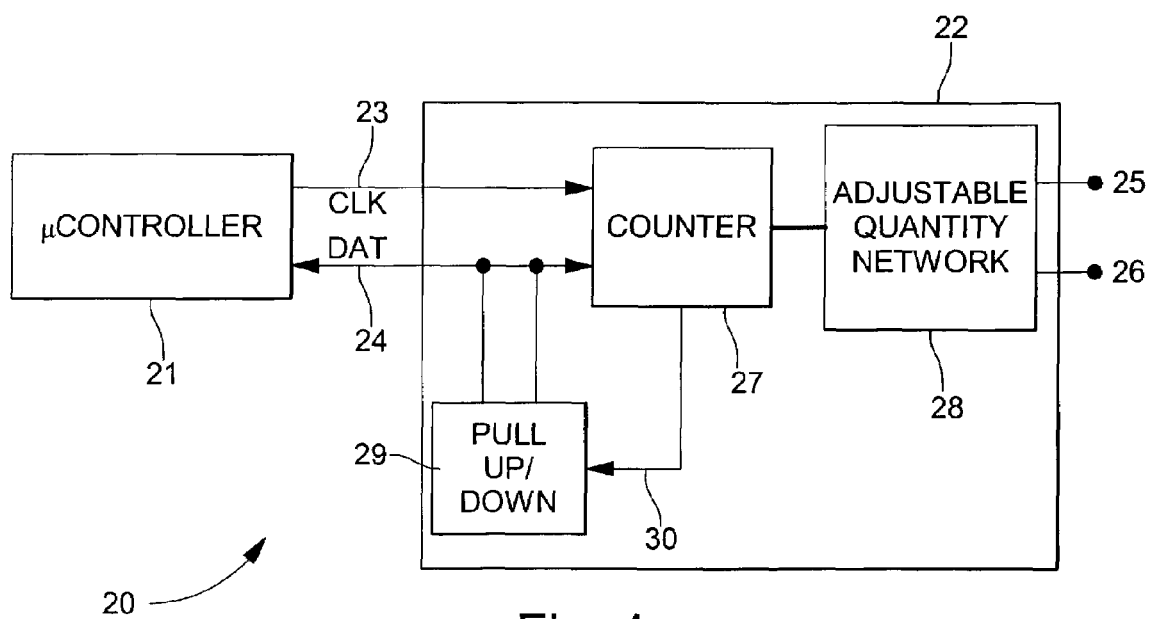
FIG. 4 is a block diagram of a circuit according to the invention.

FIG. 4 shows a circuit 20 comprising a controller device, which may be in particular, a microcontroller 21 and a controlled device, which may be in particular, an electronic device 22 comprising a counter 27 and an adjustable quantity network. The microcontroller 21 and the counter 27 of the electronic device 22 are coupled by a clock line (CLK) 23 and a data line (DAT) 24. It is to be noted that the data line 24 may be tri-stated, as an input, an output or set to a high impedance state by the controller device.

When the controlled device 22 is connected to an external driver such as the microcontroller 21, only the microcontroller signals, which are stronger than the internal signals of the electronic device 22, can be read on the data line.

When the data line is set to a high impedance state by the controller device, internal pull-up or pull-down means 29, being no more in competition with an external driver, may set the data line 24 to a proper requested state. These internal pull-up or pull-down means 29 are preferably formed by two current sources which are monitored by a feedback signal 30 of the counter 27.

The electronic device 22 also comprises first 25 and second 26 output terminals at which the adjusted quantity of the adjustable quantity network 28 can be read. The circuit 1 is supplied by conventional means which are not shown, as described in FIG. 3.

The microcontroller 21 may send control signals via the two lines 23 and 24, for example increment and decrement signals in order to increment or decrement the value of the counter 27. This counter value allows the quantity network 28 to be adjusted to the desired value between the output terminals 25 and 26.

Figures 1, 2:
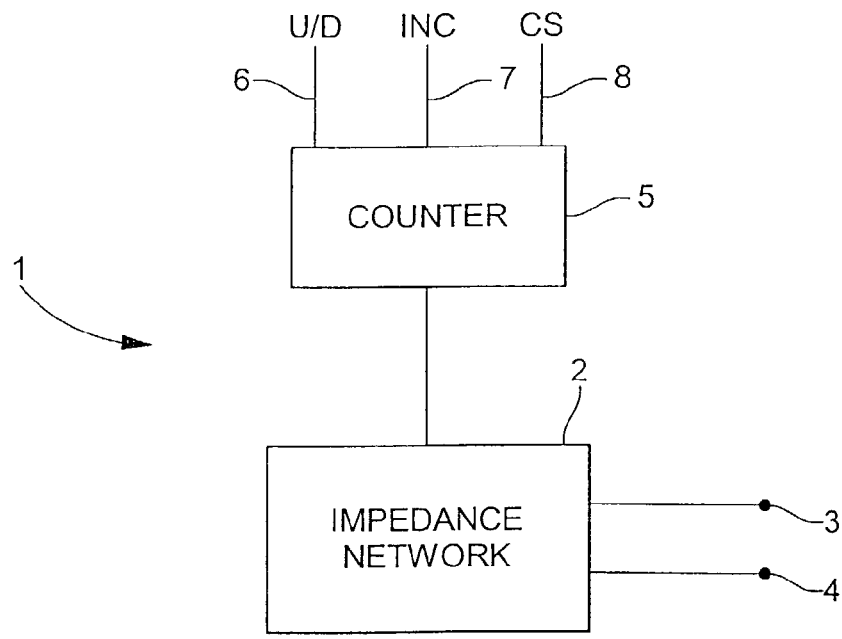
FIG. 1, already described, is a block diagram of a variable impedance circuit of the prior art.
FIG. 2, already described, is an array of the different functions of the circuit of FIG. 1.
Figure 3:
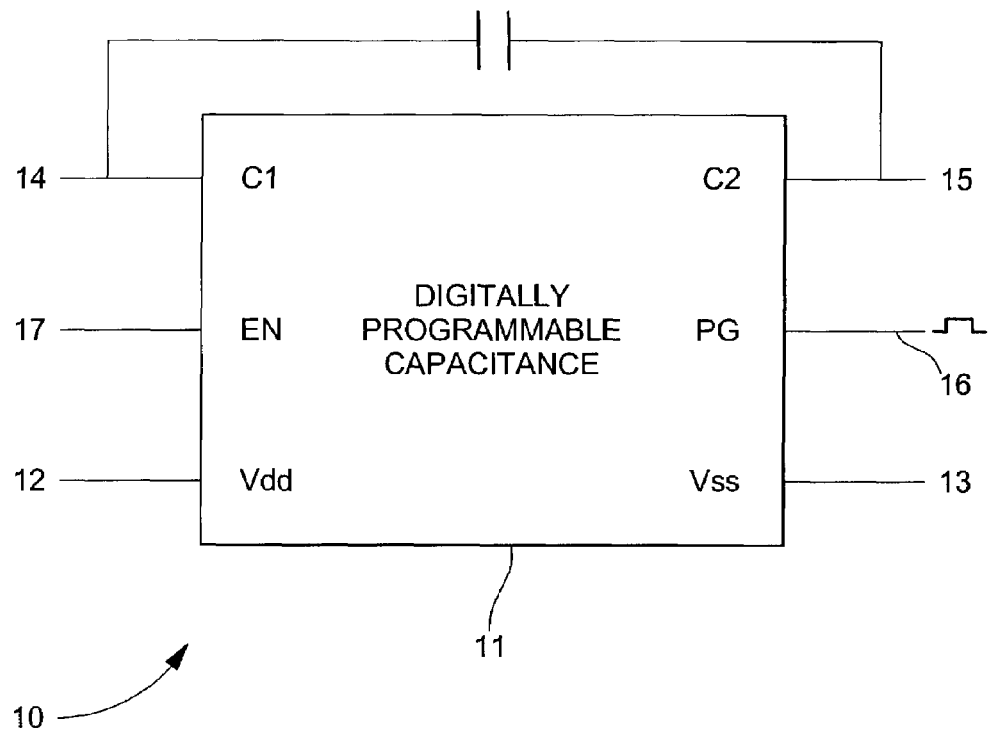
FIG. 3, already described, is a block diagram of an electronic trim capacitor of the prior art.

The adjustable quantity network 28 may be a digitally programmable capacitance similar to the one shown in FIG. 3, an impedance network similar to the one shown in FIG. 1, and also any adjustable quantity such as current level.

Figures 5, 6:
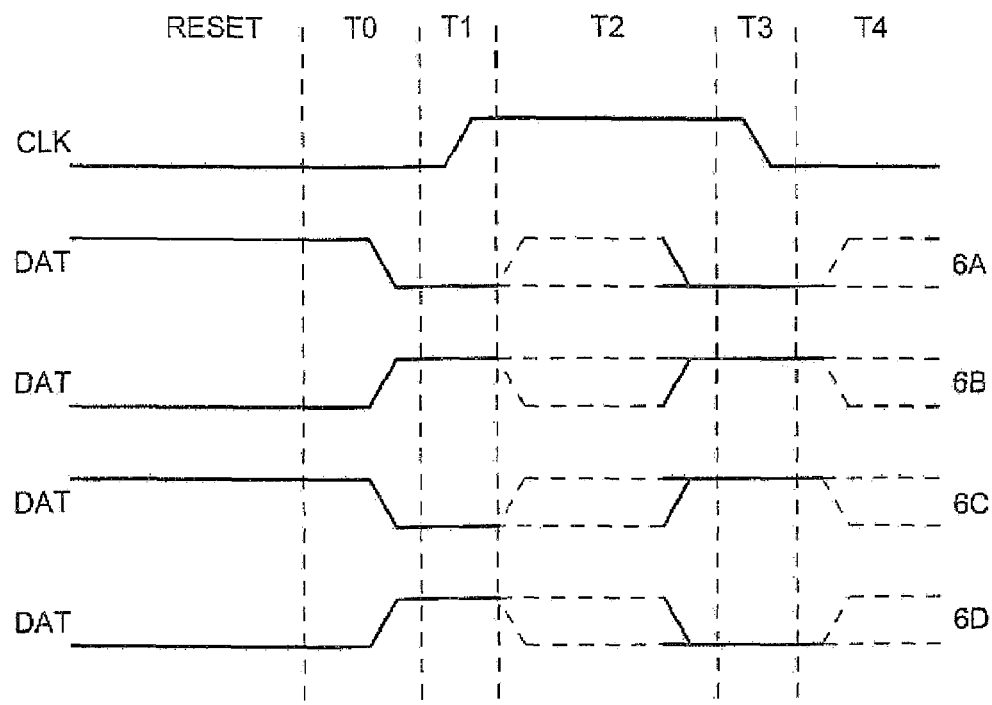
FIG. 5 is an array of possible control signals.
FIG. 6 is a timing diagram representing sequences of the two-wire communication protocol.

FIG. 5 is an array of preferred control signals which may be sent by the microcontroller to the electronic device. In this example, the control signals comprise two bits which allow four control signals. However, it is also possible to define control signals comprising more than two bits in order to have a greater number of control signals available.

The two most important instructions required to adjust the quantity of said electronic device are the increment and decrement functions. These instructions are preferably chosen with a different first data bit. For example, "0" as first data bit for the decrement function and "1" as first data bit for the increment function.

Thus, the decrement function has been defined as "00" and the increment function as "11". With these four control signals, there are still two available functions. This may be a first test mode (T1) defined as "01" and a second test mode (T2) defined as "10".

FIGS. 6A-6D show timing diagrams representing examples of communication protocol sequences on the clock and data lines with four control signal as described above. The timing diagram is divided into periods which represent the different steps in the protocol communications between the microcontroller and the electronic device and more specifically the counter. The control signals sent by the microcontroller to the counter comprise two data bits on the data line.

Before the microcontroller can send any control signals to the counter, a start condition has to be detected by the counter. This start condition, represented in period T0 in FIGS. 6A-6D, may be, for example, a combination of low-to-high or high-to-low transition on the data line (DAT) while the clock line (CLK) is stable at a high or low (as shown in FIG. 6) state.

After the start condition has occurred, the first data bit of a control signal is latched on the first edge received on the clock line by the counter during the period T1.

After receiving the first data bit during period T1, the counter and the associated logic can anticipate the control signal by analysing the first bit received and then may provide with a feedback status. In FIGS. 6A and 6C, the first data bit received is "0", then the counter can anticipate a decrement request. Conversely in FIGS. 6B and 6D, the first data bit received is "1", then the counter can anticipate an increment request. According to the anticipated control signal, a data bit is then generated by the electronic device. Preferably, this data bit acknowledges whether the anticipated increment or decrement request is possible or not.

If a maximum count value has already been reached in the counter and another increment request is anticipated, i.e. the first data bit is "1", or if a minimum count value has already been reached in the counter and another decrement request is anticipated, i.e. the first data bit is "0", then the acknowledgement data bit will be set for example to "1" after the clock edge of period T1. In all other cases, the acknowledgment data will be set to "0".

To read the acknowledgment data bit, the data line is temporarily tri-stated by the microcontroller after the clock edge of period T1. The data line is tri-stated means that the corresponding terminal of the counter is set in a high impedance state by the controller device. This allows internal pull-up or pull-down means of the electronic device to set the data line to the proper state corresponding to the acknowledgment data bit during period T2. Thus during this period T2, the acknowledgment data bit on the data line may be read by the microcontroller.

The second data bit of a control signal is latched on the next edge received on the clock line by the counter during period T3, consecutive to the first edge received during period T1.

According to the requested instruction, increment, decrement or test modes, the counter will, respectively, increment or decrement if possible, or will do the appropriate test corresponding to the requested test mode. In FIG. 6A, the second data bit received is "0", so the requested instruction is a decrement one. In FIG. 6B, the second data bit received is "1", so the requested instruction is an increment one. In FIG. 6C, the second data bit received is "1", so the requested instruction is the first test mode. Finally in FIG. 6D, the second data bit received is "0", so the requested instruction is the second test mode.

After the control signals have been received, after period T3, during period T4 corresponding to an executing period, the requested instruction is executed if possible. The value of the counter is respectively incremented (6A) or decremented (6B) if possible. Or, in the case of a test mode request, the data line is set to an output state and the clock line may receive a pulse that gates the data line which is an output of the counter to produce a desired action. Output test data from the controlled device may set on the data line with an output driver or using the pull-up or pull-down means.

It is to be noted that an additional data acknowledgement bit may optionally be sent. This second acknowledgment data bit may for example confirm whether the control signal has correctly been completely latched.

In the same way as for the first acknowledgment data bit, in order to read the second acknowledgment data bit, the data line is temporarily set in a high impedance state by the microcontroller after the clock edge of period T3. This allows internal pull-up or pull-down means of the electronic device to set the data line to the proper state corresponding to the second acknowledgment data bit during period T4. Thus during this period T4, the second acknowledgment data bit on the data line may be read by the microcontroller.

The invention claimed is:

1. A two-wire communication protocol between a controller device and a controlled device, both devices being coupled by a clock line and a data line, said controller device sending control signals comprising N bits, N being greater than or equal to two, to the controlled device via the data line, wherein the bits of said control signals are latched onto the controlled device on consecutive edges of a clock signal sent by the controller device to the controlled device on the clock line, wherein after at least one of the N-1 first bits of a control signal has been latched onto the controlled device, the data line is temporarily set by the controller device in high impedance state during which a first acknowledgement data bit, which acknowledges whether the execution of an instruction corresponding to an anticipated control signal is possible or not, is generated by the controlled device,
wherein the number N of bits of a control signal is greater than or equal to 2, which allows four control signals, said acknowledgement data bit being generated after the first bit of a control signal has been latched, and
wherein said controlled device is an electronic device with a digitally adjustable quantity which comprises a counter storing a value of the digitally adjustable quantity, and wherein said four control signals include at least an increment signal and a decrement signal of said value.

2. The two-wire communication protocol according to claim 1, wherein the first acknowledgement data bit sets the data line into a state representative of the possibility of execution of said anticipated control signal.

3. The two-wire communication protocol according to claim 1, wherein said increment and decrement signals have a different first bit, and wherein said acknowledgement data bit sets the data line into a state of an anticipated increment or decrement signal which acknowledges whether a corresponding increment or decrement of the value stored in the counter is possible or not.

4. The two-wire communication protocol according to claim 1, wherein said four control signals further include at least one test mode signal.

5. The two-wire communication protocol according to claim 4, wherein after the second bit of said test mode signal has been latched, the data line is temporarily set in said high impedance state by the controller device during which a secondary acknowledgement data bit is generated by the controlled device which sets the data line into a state representative of the control signal.

6. The two-wire communication protocol between a controller device and a controlled device, both devices being coupled by a clock line and a data line, said controller device sending at least four control signals comprising 2 bits, to the controlled device on the data line wherein
during a first period a start condition occurs;
during a second period a first bit of a control signal is latched on the data line when a first edge occurs on the clock line;
during a third period after said first edge on the clock line, the data line is temporarily set in a high impedance state by the controller device during which a data bit is generated by the controlled device which acknowledges whether an anticipated control signal is possible or not;
during a fourth period a second bit of said control signal is latched on the data line when a second edge consecutive to said first edge occurs on the clock line;
during a fifth period the control signal is executed if possible.

7. The two-wire communication protocol according to claim 6, wherein said controlled device is an electronic device with a digitally adjustable quantity which comprises a counter storing a value of the digitally adjustable quantity, wherein said four control signals include an increment signal and a decrement signal of said value which have a different first bit and at least one test mode signal, and wherein
during said third period said data bit acknowledges whether a corresponding increment or decrement of the value stored in the counter is possible or not.

8. The two-wire communication protocol according to claim 7, wherein during the fifth period after the second bit has been latched, the data line is temporarily set in said high impedance state by the controller device during which a secondary acknowledgement data bit is generated by the controlled device which sets the data line in a state representative of the control signal.

* * * * *